US009327353B2

(12) United States Patent
Shpigelman et al.

(10) Patent No.: US 9,327,353 B2
(45) Date of Patent: May 3, 2016

(54) ROUGHING AND SEMI-FINISHING END MILL HAVING SERRATED AND NON-SERRATED CUTTING TEETH

(71) Applicant: Iscar, Ltd., Tefen (IL)

(72) Inventors: Leonid Shpigelman, Carmiel (IL); Eliyahu Budda, Neve Ziv (IL); Alexander Khina, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 317 days.

(21) Appl. No.: 13/711,425

(22) Filed: Dec. 11, 2012

(65) Prior Publication Data

US 2014/0161546 A1    Jun. 12, 2014

(51) Int. Cl.
*B23C 5/10*    (2006.01)

(52) U.S. Cl.
CPC ........... *B23C 5/10* (2013.01); *B23C 2210/0407* (2013.01); *B23C 2210/0414* (2013.01); *B23C 2210/088* (2013.01); *B23C 2220/605* (2013.01); *Y10T 407/1948* (2015.01)

(58) Field of Classification Search
CPC .............................. B23C 5/10; B23C 2210/12
USPC ....................................................... 407/53, 54
See application file for complete search history.

(56) References Cited

U.S. PATENT DOCUMENTS

| 4,497,600 | A  | * | 2/1985  | Kishimoto      | 407/53 |
|-----------|----|---|---------|----------------|--------|
| 5,049,009 | A  | * | 9/1991  | Beck et al.    | 407/54 |
| 6,164,876 | A  |   | 12/2000 | Cordovano      |        |
| 6,991,409 | B2 |   | 1/2006  | Noland         |        |
| 8,007,209 | B2 |   | 8/2011  | Maushart et al.|        |
| 8,414,228 | B2 | * | 4/2013  | Wells et al.   | 407/54 |
| 2002/0090273 | A1 |   | 7/2002 | Serwa          |        |
| 2006/0045638 | A1 | * | 3/2006 | Flynn          | 407/53 |

FOREIGN PATENT DOCUMENTS

JP          06190622 A   *  7/1994
JP       2005297108 A   * 10/2005

OTHER PUBLICATIONS

English translation of JP 2005297108 A, Oct. 2005.*

* cited by examiner

*Primary Examiner* — Sunil K Singh
*Assistant Examiner* — Alan Snyder
(74) *Attorney, Agent, or Firm* — Womble Carlyle

(57) ABSTRACT

An end mill having a plurality of teeth configured for both roughing and semi-finishing applications, the teeth being alternated with a plurality of flutes. At least one tooth of the plurality of cutting teeth is a serrated tooth formed with serrations along a relief surface thereof and at least one other tooth is free of serrations. Each tooth of the plurality of cutting teeth includes an actual internal cutting angle formed at an intersection of a rake cutting sub-surface and a relief surface. The actual internal cutting angle of each tooth has a greater value than an imaginary internal cutting angle formed at an intersection of imaginary extension lines of a rake recessed sub-surface and a relief surface of the same tooth.

20 Claims, 3 Drawing Sheets

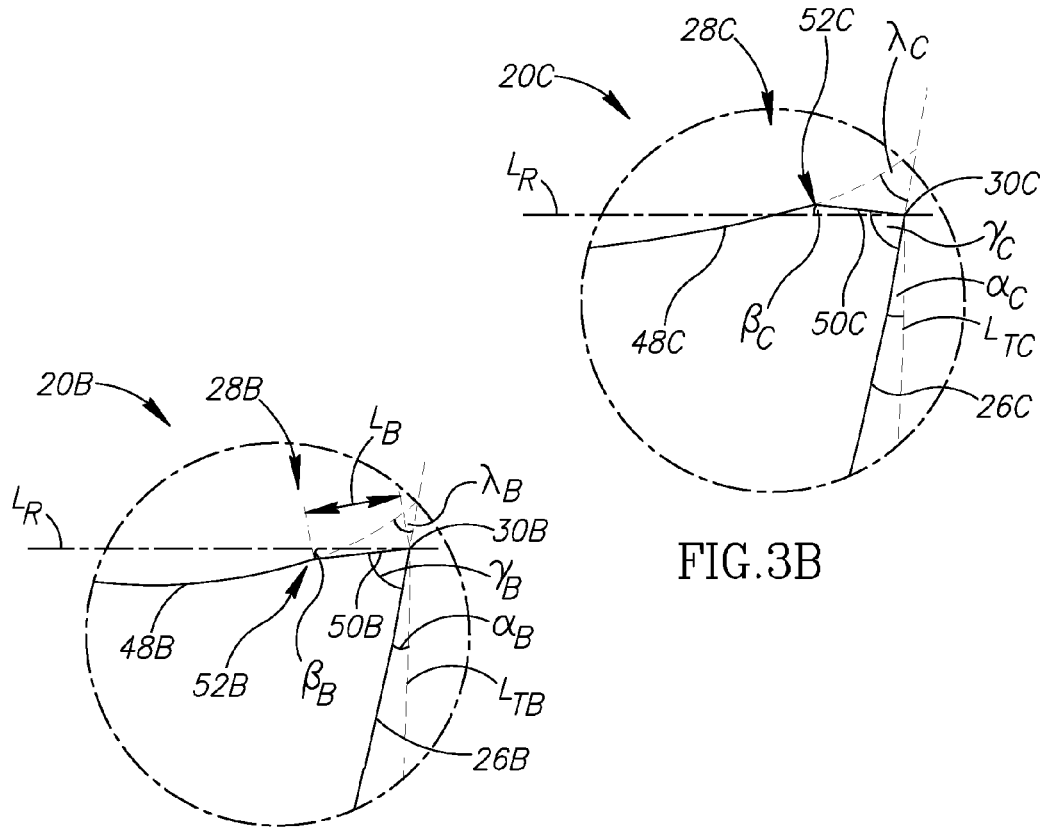
FIG.3B
FIG.3A
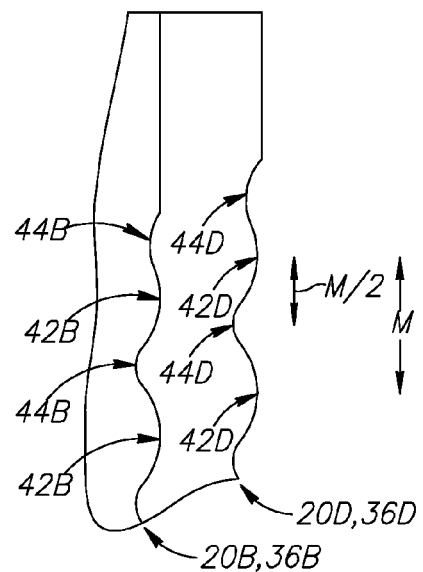
FIG.4

ROUGHING AND SEMI-FINISHING END MILL HAVING SERRATED AND NON-SERRATED CUTTING TEETH

FIELD OF THE INVENTION

The subject matter of the present application relates to end mills for machining metal workpieces, and in particular to end mills with serrated and non-serrated teeth configured for both roughing and semi-finishing applications.

BACKGROUND OF THE INVENTION

End mills having serrated and non-serrated teeth are disclosed in U.S. Pat. No. 6,164,876 and U.S. 2002/0090273.

End mills having serrated and non-serrated teeth are a specific type of end mill configured for simultaneously providing two machining applications, in the end mill of the present application roughing and semi-finishing applications.

While many end mills superficially appear similar, upon close inspection there are often many small but relevant differences, some differences being critical as to whether an end mill can achieve a desired machining operation of a particular type of material or under particular cutting conditions.

Commonly, cutting edges are placed at different index angles with respect to each other, helix, radial rake and axial rake angles may vary at different cutting edges and even may vary along a single cutting edge. Orientation, location and size of each element in an end mill may have significant effect on the performance thereof.

A problem long discussed in end mill literature is one of chatter. Reducing chatter can be achieved by designing end mills with asymmetric elements, for example, as disclosed in U.S. Pat. Nos. 6,991,409 and 8,007,209.

SUMMARY OF THE INVENTION

In accordance with a first aspect of the subject matter of the present application, there is provided a roughing and semi-finishing end mill configured with cutting teeth having repetitive and/or symmetric features, in combination with rake cutting sub-surfaces having actual internal cutting angles having greater values than imaginary internal cutting angles associated with adjacent rake recessed sub-surfaces.

In accordance with a second aspect of the subject matter of the present application, there is provided a roughing and semi-finishing end mill configured with serrated and non-serrated cutting teeth, the serrations being spaced apart from end reliefs of the serrated teeth, and rake cutting sub-surfaces of the cutting teeth having actual internal cutting angles having greater values than imaginary internal cutting angles associated with adjacent rake recessed sub-surfaces.

In accordance with a third aspect of the subject matter of the present application, there is provided a roughing and semi-finishing end mill having a longitudinal rotation axis and comprising: a shank portion and a cutting portion extending from the shank portion and being integrally formed with a plurality of cutting teeth alternated with a plurality of flutes; each tooth of the plurality of cutting teeth comprising a rake surface, a relief surface, and a cutting edge formed at an intersection of the rake and relief surfaces; each rake surface comprising a rake recessed sub-surface, a rake cutting sub-surface located further than the rake sub-surface from the rotation axis, and a discontinuity formed at an intersection of the rake recessed and rake cutting sub-surfaces; wherein each tooth of the plurality of cutting teeth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface; wherein each tooth of the plurality of cutting teeth has a rake cutting sub-surface length dimension which is measured from the discontinuity thereof to the cutting edge thereof, the rake cutting sub-surface length dimension having a value less than 5% of the respective tooth's radius dimension which is measured in a straight line from the rotation axis to the cutting edge; wherein the plurality of cutting teeth comprises at least one serrated tooth which is formed with serrations along the relief surface thereof and at least one non-serrated tooth which is free of serrations along the relief surface thereof; and wherein the serrations of the at least one serrated tooth are spaced apart from an end relief thereof by a spacing-distance greater than about half of a peak-distance, the peak-distance being measured between adjacent peaks of the serrations.

In accordance with a fourth aspect of the subject matter of the present application, there is provided a roughing and semi-finishing end mill having a longitudinal rotation axis and comprising: a shank portion and a cutting portion extending from the shank portion and being integrally formed with a plurality of cutting teeth which are circumferentially spaced apart from one another; each tooth of the plurality of cutting teeth comprising a rake surface, a relief surface, and a cutting edge formed at an intersection of the rake and relief surfaces; each rake surface comprising a rake recessed sub-surface, a rake cutting sub-surface located further than the rake sub-surface from the rotation axis, and a discontinuity formed at an intersection of the rake recessed and rake cutting sub-surfaces; wherein the plurality of cutting teeth include at least one serrated cutting tooth having serrations and an end relief; and wherein, in at least one cross-section of the cutting portion: each tooth of the plurality of cutting teeth has a rake cutting sub-surface length dimension which is measured from the discontinuity thereof to the cutting edge thereof, the rake cutting sub-surface length dimension having a value less than 5% of the respective tooth's radius dimension which is measured in a straight line from the rotation axis to the cutting edge; and for each tooth of the plurality of cutting teeth, the rake cutting sub-surface and the rake recessed sub-surface are arranged relative to one another such that a chip cut from a workpiece contacts the rake cutting sub-surface, but not the rake recessed sub-surface immediately adjacent the discontinuity on a side away from the cutting edge.

It will be understood that the above-said is a summary, and that any of the aspects above may further comprise any of the features described in connection with any of the other aspects or described hereinbelow. Specifically, the following features, either alone or in combination, may be applicable to any of the above aspects:

A. A tooth arrangement can be a repetitive arrangement. For example, a plurality of teeth can be in a repetitive arrangement in which serrated teeth are alternated with non-serrated teeth in a circumferential direction. A plurality of cutting teeth can be in an alternating arrangement in which teeth with positive radial rake angles are alternated with teeth with negative radial rake angles. A plurality of cutting teeth can be in an arrangement wherein each second radial rake angle has the same value. A plurality of cutting teeth can be in an arrangement wherein each second tooth can be identical, except for positions of serrations (which may or may not be identically positioned).

B. Preferably, the radial rake angles are within a range of 7° to −7°, and more preferably within a range of 3° to −3°. Best performance found for tested embodiments has been found with radial rake angles of about 2° and about −2°.

C. A cutting tooth arrangement can be a symmetric arrangement. For example, a plurality of teeth can be in a symmetric arrangement in which serrated teeth are located diametrically opposed to serrated teeth and non-serrated teeth are located diametrically opposed to non-serrated teeth. Each of a plurality of flutes can have the same helix angle and/or the same constant helix angle. All rake recessed sub-surfaces can have the same shape, preferably a concave shape. All index angles in each plane can be equal. Even in other embodiments, in which not all index angles in each plane differ, it has been found that symmetry at a plane in the center of a cutting portion, i.e. identical index angles in such plane, can be beneficial.

D. Each rake cutting sub-surface of a tooth can have an actual internal cutting angle having a greater value than an imaginary internal cutting angle of the same tooth.

E. Each rake cutting sub-surface can be essentially straight.

F. An end mill can be configured for rotation about a rotation axis extending longitudinally through the center thereof.

G. An end mill can comprise a shank portion and a cutting portion extending from the shank portion and being integrally formed with a plurality of cutting teeth alternated with a plurality of flutes.

H. A tooth can comprise a rake surface, a relief surface, and a cutting edge formed at an intersection of the rake and relief surfaces.

I. A rake surface can comprise a rake recessed sub-surface, a rake cutting sub-surface located further than the rake recessed sub-surface from the rotation axis, and a discontinuity formed at an intersection of the rake recessed and rake cutting sub-surfaces.

J. Each tooth can comprise an actual internal cutting angle formed at an intersection of a rake cutting sub-surface and a relief surface, the actual internal cutting angle having a greater value than an imaginary internal cutting angle formed at an intersection of imaginary extension lines of a rake recessed sub-surface and the relief surface. The actual internal cutting angle can have a value which differs from the imaginary internal cutting angle by 4° to 15°. Preferably, the actual internal cutting angle can have a value which differs from the imaginary internal cutting angle by 8° to 13°.

K. Each tooth of the plurality of cutting teeth can have a rake cutting sub-surface length dimension which is measured from a discontinuity thereof to a cutting edge thereof. The rake cutting sub-surface length dimension can have a value less than 5% of the respective tooth's radius dimension, which is measured in a straight line from a rotation axis to a cutting edge. Preferably, the rake cutting sub-surface length dimension can have a value of 1% to 4% of the tooth's radius dimension. A suitable value for a tested embodiment was a rake cutting sub-surface length dimension of about 2.6% of the tooth's radius dimension.

L. An end mill can comprise at least one serrated tooth which is formed with serrations along the relief surface thereof and at least one non-serrated tooth which is free of serrations along the relief surface thereof, thereby configuring the end mill for roughing and semi-finishing operations. The at least one serrated tooth can preferably have a serrated tooth radius which is smaller than a non-serrated tooth radius of the at least one non-serrated tooth. Good performance for tested embodiments has been found when the serrated tooth radius is between 0.1% to 1.2% smaller than the non-serrated tooth radius.

M. Serrations can be spaced apart from an end relief thereof by a spacing-distance greater than about half of a peak-distance, the peak-distance being measured between adjacent peaks of the serrations.

N. Each serrated tooth of the plurality of cutting teeth can be formed with a positive radial rake angle and each non-serrated tooth of the plurality of cutting teeth can be formed with a negative radial rake angle.

O. An end mill can have at least two serrated teeth, and the crests of serrations of the serrated teeth can be configured to only partially (and hence not completely) overlap.

P. At a cross-section of the cutting portion, each tooth of a plurality of cutting teeth comprises an actual internal cutting angle formed at an intersection of a rake cutting sub-surface and a relief surface, an actual internal cutting angle having a greater value than an imaginary internal cutting angle formed at an intersection of imaginary extension lines of a rake recessed sub-surface and the relief surface.

Q. Along the entire cutting portion each tooth of a plurality of cutting teeth has a rake cutting sub-surface length dimension which is measured from the discontinuity thereof to a cutting edge thereof, a rake cutting sub-surface length dimension having a value less than 5% of the respective tooth's radius dimension which is measured in a straight line from a rotation axis to the cutting edge.

R. Each associated rake cutting sub-surface and rake recessed sub-surface can be arranged relative to one another such that a chip cut from a workpiece contacts the rake cutting sub-surface, but not the rake recessed sub-surface immediately adjacent the discontinuity on a side away from the cutting edge.

While highly asymmetric serrated tooth tools for roughing, or non-serrated tooth tools for finishing, might provide optimum results for specific finishing or roughing applications respectively, it is believed that combination roughing and semi-finishing tools nonetheless can be beneficial in certain circumstances. Possible benefits of some of the particular combination of features found to be beneficial will now be discussed.

While it is believed that asymmetry can reduce chatter, it has been found that potential benefits of certain symmetric features may outweigh benefits of increased reduction in chatter, i.e. that sacrificing some asymmetry may achieve a relatively cost-effective yet robust end mill.

End mills in accordance with the subject matter of the present application are believed to have a combination of features which on the one hand sufficiently reduce chatter and on the other hand are economically competitive and capable of machining even difficult materials such as titanium (which can quickly degrade an end mill).

Robustness of such end mills is believed to be improved, for example, by spacing serrations from an end relief of a serrated tooth to protect the edge of the tooth and providing a combination of particular cutting edge features.

While it will be understood that provision of a special construction of a cutting edge increases the production cost thereof (due to any extra production steps needed) and blunt cutting edges of the type described below can increase machining power requirements due to lower radial rake angle values, nonetheless the construction described below is believed to have provided a suitable solution for particular applications.

Provision of a recessed rake surface (called hereinafter a rake recessed sub-surface and described further below) is believed in theory to reduce heat transfer to an end mill when cutting materials such as titanium. Minimizing the length of a rake cutting sub-surface is also believed to reduce heat transfer by reducing contact of chips with an end mill surface.

BRIEF DESCRIPTION OF THE DRAWINGS

For a better understanding of the subject matter of the present application, and to show how the same may be carried out in practice, reference will now be made to the accompanying drawings, in which:

FIG. 3A is an enlarged view of a cutting edge shown in FIG. 2C;

FIG. 3B is an enlarged view of a cutting edge, different to the cutting edge in FIG. 3A, shown in FIG. 2C; and FIG. 4 is a schematic view showing the alignment of serrations of cutting teeth.

DETAILED DESCRIPTION

Figures 1A, 1B:
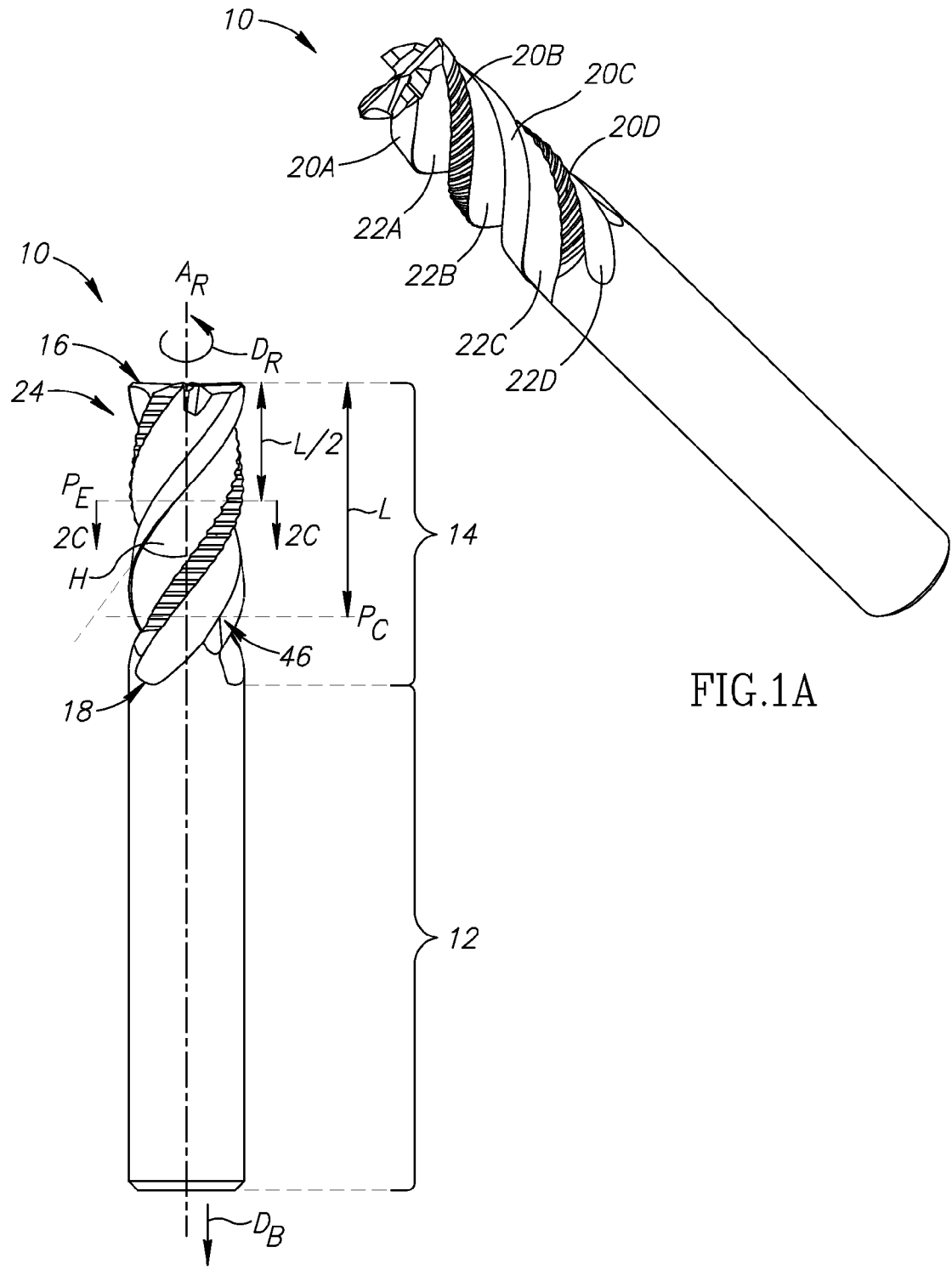
FIG. 1A is a perspective view of an end mill in accordance with an embodiment according to the subject matter of the present invention.
FIG. 1B is a side view of the end mill in FIG. 1A.
Figure 2A:
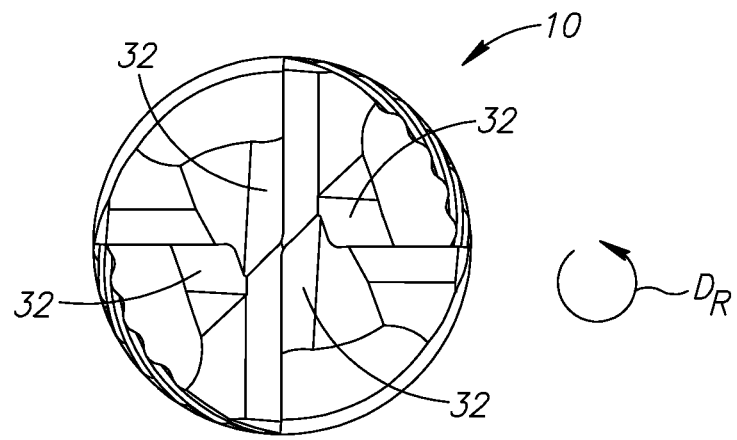
FIG. 2A is an end view of the end mill in FIGS. 1A and 1B.

Reference is made to FIGS. 1A and 1B, which illustrate a roughing and semi-finishing end mill 10, typically made of extremely hard and wear-resistant material such as cemented carbide, configured to rotate about a rotation axis ($A_R$) extending longitudinally through the center thereof in a counter-clockwise direction $D_R$ in the view shown in FIG. 2A.

The end mill 10 comprises a shank portion 12 and a cutting portion 14 extending therefrom.

More precisely, the cutting portion 14 extends along the rotation axis $A_R$ in a rearward axial direction $D_B$ from a cutting end face 16 to a furthermost flute end 18.

The cutting portion 14 is integrally formed with at least one cutting tooth 20A, 20B, 20C, 20D and at least one flute 22A, 22B, 22C, 22D.

The flutes 22A, 22B, 22C, 22D can be helical flutes. The flutes can all have the same constant helix angle H. In this non-limiting example, the helix angle H is about 45°, which has been found to be an effective value when machining titanium.

The cutting portion 14 has an effective cutting length L extending from the cutting end face 16 to a cutting length plane $P_C$ extending perpendicular to the rotation axis $A_R$ and located where the at least one flute 22A, 22B, 22C, 22D begins to exit (i.e. become more shallow) or a tooth relief surface 46 of the end mill 10 is no longer effective.

End mills of the subject matter of the present application have been found to have acceptable performance when comprising an equal-index-angle plane $P_E$ (shown in FIG. 1B along the same line designated as 2C-2C) which is perpendicular to the rotation axis $A_R$, and at which all index angles are equal. The equal-index-angle plane $P_E$ is believed to have the most benefit when being located in the middle of an active cutting portion 24 of the cutting portion 14, i.e. half the distance (L/2) from the cutting end face 16 to the cutting length plane $P_C$.

The following description is made specifically regarding two teeth 20B, 20C for the purpose of being succinct. It is noted that in this example embodiment tooth 20A is identical and diametrically opposed to tooth 20C, and tooth 20B is identical and diametrically opposed to tooth 20D (except for an offset of the serrations shown in FIG. 4). It will be understood that in other embodiments this may not be the case. Nonetheless, reference characters mentioned below in connection to teeth 20B and 20C, but alternatively suffixed with A or D to show their connection to teeth 20A and 20D, may be found in the description or drawings and should be understood as corresponding to identical features of the diametrically opposed counterpart tooth.

Figure 2B:
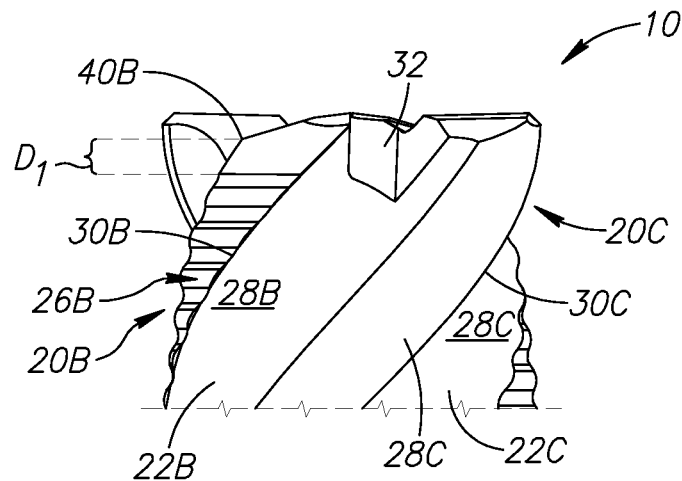
FIG. 2B is an enlarged side view of a portion of the end mill in FIG. 1B.
Figure 2C:
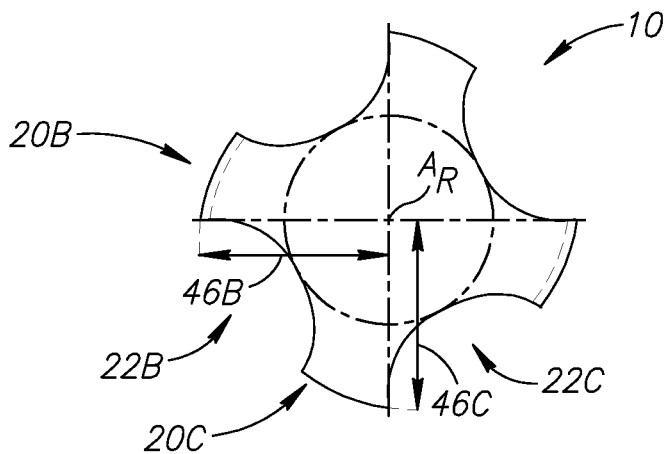
FIG. 2C is a cross section taken along line 2C-2C in FIG. 1B.

Referring also to FIGS. 2A to 2C, each tooth 20B, 20C comprises a relief surface 26B, 26C, a rake surface 28B, 28C and a cutting edge 30B, 30C formed at an intersection thereof. It is understood that a rake surface of a tooth of an end mill also constitutes a surface of an adjacent flute.

The end mill 10 can be gashed, and in this example end gashes 32 are shown.

Referring also to FIGS. 3A and 3B, the relief surfaces 26B, 26C can both form the same radial relief angle $\alpha_B$, $\alpha_C$, measured relative to an imaginary circular line $L_{TB}$, $L_{TC}$ having the same diameter of the associated tooth. In the example embodiment shown, the radial relief angles $\alpha_B$, $\alpha_C$ are about 7°.

Referring also to FIG. 4, the serrated tooth 20B is formed with serrations 36B along the relief surface 26B thereof. Serrations 36B, 36D of different serrated teeth 20B, 20D, where such exist, can overlap as shown. More precisely, the serrations 36B, 36D are offset relative to each other.

As shown in FIG. 2B, the serrations 36B start a predetermined distance D1 from an end relief 40B of the serrated tooth 20B.

As shown in FIG. 4, the serrations 36B, 36D can be periodic, i.e. having a common peak-distance M measured between adjacent peaks 42B, 42D or adjacent troughs 44B, 44D. The predetermined distance D1 can be a distance greater than about half of the peak-distance M (i.e. M/2). Such construction is believed to provide robustness to teeth of an end mill, by safely spacing serrations from the end relief 40B to avoid sharp projections thereat.

As shown in FIG. 2C, the serrated tooth 20B has a serrated tooth radius 46B, and the non-serrated tooth 20C has a non-serrated tooth radius 46C. In this example, the serrated tooth radius 46B is smaller than the non-serrated tooth radius 46C.

Referring to FIGS. 3A and 3B, the rake surfaces 28B, 28C each comprise a rake recessed sub-surface 48B, 48C a rake cutting sub-surface 50B, 50C and a discontinuity 52B, 52C formed at an intersection thereof.

To simplify manufacture, the rake recessed sub-surfaces 48B, 48C can have the same shape, which can be a concave shape as shown in FIGS. 3A and 3B. Notably, the shape is recessed from the associated rake cutting sub-surface 50B, 50C so that metal chips which have been cut from a workpiece (not shown) can preferably pass over the rake recessed sub-surfaces 48B, 48C without contact, especially at points immediately adjacent the discontinuity 52B, 52C, thereby reducing heat transfer to the end mill.

Each rake cutting sub-surface 50B, 50C has an actual internal cutting angle $\gamma_B$, $\gamma_C$ having a greater value than an imaginary internal cutting angle $\lambda_B$, $\lambda_C$ associated with the rake recessed sub-surface 48B, 48C of the same tooth.

Each rake cutting sub-surface 50B, 50C can be essentially straight. Stated differently, the cutting sub-surface 50B, 50C appear straight when observed without magnification means.

Each tooth of the plurality of cutting teeth can have a rake cutting sub-surface length dimension $L_B$ (shown only in FIG. 3A, however it will be understood that such dimension being measurable for each rake cutting sub-surface from the discontinuity to the cutting edge thereof).

Each rake cutting sub-surface 50B, 50C can have a radial rake angle $\beta_B$, $\beta_C$ measured from an imaginary radial line $L_R$ of the end mill 10 which extends from rotation axis $A_R$ to the cutting edge 30B, 30C.

In the non-limiting embodiment shown, the radial rake angle $\beta_B$ of the serrated tooth 20B is about 2° and the radial rake angle $\beta_C$ of the non-serrated tooth 20C is about −2°.

The description above includes an exemplary embodiment, and the claims should not be limited to the features seen in the exemplary embodiment.

What is claimed is:

1. A roughing and semi-finishing end mill having a longitudinal rotation axis and comprising:
    a shank portion and
    a cutting portion extending from the shank portion and being integrally formed with a plurality of cutting teeth alternated with a plurality of flutes;
each tooth of the plurality of cutting teeth comprising
    a rake surface,
    a relief surface, and
    a cutting edge formed at an intersection of the rake and relief surfaces;
each rake surface comprising
    a rake recessed sub-surface,
    a rake cutting sub-surface located further than the rake sub-surface from the rotation axis, and
    a discontinuity formed at an intersection of the rake recessed and rake cutting sub-surfaces;
    wherein each tooth of the plurality of cutting teeth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;
    wherein each tooth of the plurality of cutting teeth has a rake cutting sub-surface length dimension which is measured from the discontinuity thereof to the cutting edge thereof, the rake cutting sub-surface length dimension having a value less than 5% of the respective tooth's radius dimension which is measured in a straight line from the rotation axis to the cutting edge;
    wherein the plurality of cutting teeth comprises at least one serrated tooth which is formed with serrations along the relief surface thereof and at least one non-serrated tooth which is free of serrations along the relief surface thereof; and
    wherein the serrations of the at least one serrated tooth are spaced apart from an end relief thereof by a spacing-distance greater than about half of a peak-distance, the peak-distance being measured between adjacent peaks of the serrations.

2. The end mill according to claim 1, wherein the actual internal cutting angle has a value which differs from the imaginary internal cutting angle by 4° to 15°.

3. The end mill according to claim 2, wherein the actual internal cutting angle has a value which differs from the imaginary internal cutting angle by 8° to 13°.

4. The end mill according to claim 1, wherein the plurality of cutting teeth are in a repetitive arrangement in which teeth having positive radial rake angles are alternated with teeth having negative radial rake angles.

5. The end mill according to claim 4, wherein the radial rake angles are within a range of 7° to −7° or within a range of 3° to −3°.

6. The end mill according to claim 5, wherein the radial rake angles are about 2° and about −2°.

7. The end mill according to claim 1, wherein the rake cutting sub-surface length dimension, measured in a straight line from the rotation axis to the cutting edge, has a value of 1% to 4% of the tooth's radius dimension.

8. The end mill according to claim 1, wherein the rake cutting sub-surface length dimension, measured in a straight line from the rotation axis to the cutting edge, has a value of about 2.6% of the tooth's radius dimension.

9. The end mill according to claim 1, wherein the plurality of teeth are in a repetitive arrangement in which serrated teeth are alternated with non-serrated teeth.

10. The end mill according to claim 1, wherein the plurality of teeth are in a symmetric arrangement in which serrated teeth are located diametrically opposed to serrated teeth and non-serrated teeth are located diametrically opposed to non-serrated teeth.

11. The end mill according to claim 1, comprising at least two serrated teeth, and crests of serrations of the at least two serrated teeth are configured to only partially overlap.

12. The end mill according to claim 1, wherein each of the plurality of flutes has the same helix angle and/or a constant helix angle.

13. The end mill according to claim 1, wherein each of the plurality of cutting teeth has a radial rake angle and the plurality of cutting teeth are in an arrangement wherein the radial rake angle of every second tooth of the plurality of cutting teeth has the same value.

14. The end mill according to claim 1, wherein each serrated tooth of the plurality of cutting teeth is formed with a positive radial rake angle and each non-serrated tooth of the plurality of cutting teeth is formed with a negative radial rake angle.

15. The end mill according to claim 1, wherein all the rake recessed sub-surfaces have the same shape.

16. The end mill according to claim 1, wherein the plurality of cutting teeth are in an arrangement wherein each second tooth is identical, except for positions of serrations which may or may not be identically positioned.

17. The end mill according to claim 1, wherein the at least one serrated tooth has a serrated tooth radius which is smaller than a non-serrated tooth radius of the at least one non-serrated tooth and the serrated tooth radius is between 0.1% to 1.2% smaller than the non-serrated tooth radius.

18. The end mill according to claim 1, wherein each of the rake cutting sub-surfaces is essentially straight.

19. A roughing and semi-finishing end mill having a longitudinal rotation axis and comprising:
    a shank portion; and
    a cutting portion extending from the shank portion, the shank portion being integrally formed with a plurality of cutting teeth alternated with a plurality of flutes, the plurality of cutting teeth comprising serrated teeth alternated with non-serrated teeth,
    each tooth comprising a relief surface, a rake surface, and a cutting edge formed at an intersection of the rake and relief surfaces;
    wherein:
    each serrated tooth is formed with a positive radial rake angle and each non-serrated tooth is formed with a negative radial rake angle;
    each rake surface comprises a rake recessed sub-surface, a rake cutting sub-surface located further than the rake sub-surface from the rotation axis, and a discontinuity formed at an intersection of the rake recessed and rake cutting sub-surfaces;
    each tooth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;

each tooth has a rake cutting sub-surface length dimension which is measured from the discontinuity thereof to the cutting edge thereof, the rake cutting sub-surface length dimension having a value less than 5% of the respective tooth's radius dimension which is measured in a straight line from the rotation axis to the cutting edge; and the serrations of the at least one serrated tooth are spaced apart from an end relief thereof by a spacing-distance greater than about half of a peak-distance, the peak-distance being measured between adjacent peaks of the serrations.

20. The end mill according to claim 19, wherein:

serrated teeth are located diametrically opposed to serrated teeth and non-serrated teeth and located diametrically opposite non-serrated teeth; and each flute has the same, constant helix angle.

\* \* \* \* \*